United States Patent
Mohan et al.

(10) Patent No.: US 8,605,604 B1
(45) Date of Patent: Dec. 10, 2013

(54) WLAN MODULE TEST SYSTEM

(75) Inventors: Vivek Mohan, Sunnyvale, CA (US); Hsui-Ping Peng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 264 days.

(21) Appl. No.: 12/971,667

(22) Filed: Dec. 17, 2010

Related U.S. Application Data

(60) Provisional application No. 61/289,933, filed on Dec. 23, 2009.

(51) Int. Cl.
H04L 12/26 (2006.01)

(52) U.S. Cl.
USPC .......................... 370/249; 370/338; 375/226

(58) Field of Classification Search
USPC ......... 370/249, 277, 913, 315, 338, 463, 474, 370/241, 224, 226
See application file for complete search history.

(56) References Cited

U.S. PATENT DOCUMENTS

| | | | | |
|---|---|---|---|---|
| 4,000,467 A * | 12/1976 | Lentz | ................................. | 455/9 |
| 4,105,973 A * | 8/1978 | Arnold et al. | .................. | 370/323 |
| 4,134,069 A * | 1/1979 | Shiki | ............................... | 455/16 |
| 5,187,806 A * | 2/1993 | Johnson et al. | ................. | 455/15 |
| 5,422,876 A * | 6/1995 | Turudic | .......................... | 370/249 |
| 6,028,845 A * | 2/2000 | Serikawa et al. | ............. | 370/249 |
| 6,055,411 A * | 4/2000 | Ishida et al. | .................. | 455/11.1 |
| 6,253,060 B1 * | 6/2001 | Komara et al. | .................... | 455/9 |
| 6,697,603 B1 * | 2/2004 | Lovinggood et al. | ........ | 455/13.1 |
| 6,728,514 B2 * | 4/2004 | Bandeira et al. | ............. | 455/13.1 |
| 6,856,652 B2 * | 2/2005 | West et al. | ..................... | 375/260 |
| 7,205,924 B2 * | 4/2007 | Vemulapalli et al. | ......... | 341/166 |
| 7,394,278 B1 * | 7/2008 | Shirvani-Mahdavi et al. | .......................... | 324/750.3 |
| 7,512,092 B2 * | 3/2009 | Laurila | ......................... | 370/328 |
| 7,689,252 B2 * | 3/2010 | Nishida et al. | ............. | 455/562.1 |
| 7,697,928 B2 * | 4/2010 | Shvodian et al. | ............. | 455/423 |
| 8,107,903 B2 * | 1/2012 | LeSage | ...................... | 455/127.1 |
| 8,149,901 B2 * | 4/2012 | De La Puente et al. | ...... | 375/219 |
| 2002/0028675 A1 * | 3/2002 | Schmutz et al. | ............. | 455/424 |
| 2003/0007473 A1 * | 1/2003 | Strong et al. | .................. | 370/338 |
| 2003/0036359 A1 * | 2/2003 | Dent et al. | ...................... | 455/63 |
| 2003/0067999 A1 * | 4/2003 | Echavarri et al. | ............. | 375/343 |
| 2003/0156567 A1 * | 8/2003 | Oak | .............................. | 370/338 |
| 2004/0255230 A1 * | 12/2004 | Chen et al. | .................... | 714/796 |
| 2005/0002327 A1 * | 1/2005 | Li | ................................ | 370/210 |
| 2006/0153240 A1 * | 7/2006 | Kikuma | ........................ | 370/474 |
| 2006/0193271 A1 * | 8/2006 | Proctor et al. | ................ | 370/294 |
| 2007/0014341 A1 * | 1/2007 | Rowse et al. | ................. | 375/224 |
| 2007/0015485 A1 * | 1/2007 | DeBiasio et al. | ............. | 455/345 |
| 2007/0026809 A1 * | 2/2007 | Zhang et al. | ............... | 455/67.11 |
| 2007/0045416 A1 * | 3/2007 | Paila et al. | ..................... | 235/435 |
| 2007/0050821 A1 * | 3/2007 | Toshikage et al. | .............. | 725/62 |
| 2007/0091864 A1 * | 4/2007 | Honjo et al. | .................. | 370/338 |
| 2007/0140291 A1 * | 6/2007 | Li | ................................ | 370/463 |
| 2007/0206628 A1 * | 9/2007 | Nishio et al. | .................. | 370/445 |
| 2007/0232291 A1 * | 10/2007 | Rathonyi et al. | ............. | 455/423 |
| 2007/0264730 A1 * | 11/2007 | Frodsham et al. | .............. | 438/14 |
| 2007/0280121 A1 * | 12/2007 | Schoenborn et al. | ......... | 370/249 |
| 2007/0286110 A1 * | 12/2007 | Proctor et al. | ................ | 370/315 |

(Continued)

*Primary Examiner* — Paul H Masur
*Assistant Examiner* — Michael Phillips

(57) ABSTRACT

Apparatus having corresponding methods and non-transitory computer-readable media comprise: a wireless local-area network (WLAN) module comprising a receiver configured to receive a WLAN signal into the WLAN module; a transmitter; and a loopback controller configured to selectively loop back the WLAN signal to the transmitter, wherein the transmitter is configured to transmit the looped-back WLAN signal from the WLAN module.

14 Claims, 5 Drawing Sheets

(56) References Cited

U.S. PATENT DOCUMENTS

| | | | |
|---|---|---|---|
| 2008/0114580 A1* | 5/2008 | Chin et al. | 703/13 |
| 2008/0195920 A1* | 8/2008 | Luce et al. | 714/798 |
| 2008/0225929 A1* | 9/2008 | Proctor et al. | 375/214 |
| 2009/0113258 A1* | 4/2009 | Parthasarathy | 714/716 |
| 2009/0179740 A1* | 7/2009 | Pillai et al. | 340/10.1 |
| 2009/0209196 A1* | 8/2009 | Haverty | 455/1 |
| 2009/0252083 A1* | 10/2009 | Kang et al. | 370/315 |
| 2009/0256644 A1* | 10/2009 | Knudsen et al. | 333/32 |
| 2009/0285134 A1* | 11/2009 | Struhsaker et al. | 370/280 |
| 2010/0061279 A1* | 3/2010 | Knudsen et al. | 370/278 |
| 2010/0238855 A1* | 9/2010 | Yoshida et al. | 370/315 |

* cited by examiner

WLAN MODULE TEST SYSTEM

CROSS-REFERENCE TO RELATED APPLICATIONS

This disclosure claims the benefit of U.S. Provisional Patent Application Ser. No. 61/289,933, entitled "Using Radio Frequency [RF] Module Loopback for WLAN SoCs ATE Test," filed on Dec. 23, 2009, the disclosure thereof incorporated by reference herein in its entirety.

FIELD

The present disclosure relates generally to integrated circuit testing. More particularly, the present disclosure relates to testing wireless local-area network (WLAN) integrated circuits.

BACKGROUND

Wireless communication networks are enjoying unprecedented popularity. Especially popular is the wireless local-area network (WLAN). In WLANs, each device includes a WLAN module for communicating over the WLAN. Each WLAN module generally includes an analog section and a digital section, and can be implemented as one or more integrated circuits.

To ensure quality, each WLAN module is tested as a unit before release. The WLAN module is generally sold as a unit, rather than as its constituent integrated circuits. Chip-level testing is generally limited to enabling and checking functional blocks on the silicon, and is mostly limited to the digital section. Therefore chip-level tests cannot cover all use cases for the entire WLAN module. In contrast, module-level testing involves using all of the functional blocks together to transmit and receive waveforms, and therefore extends into the analog section, including the radio-frequency modules. In order to avoid field returns of modules that fail module-level tests, it is desirable to test the entire WLAN module as a unit.

FIG. 1 shows a conventional WLAN module test system 100. Referring to FIG. 1, test system 100 includes automated test equipment (ATE) 102 in communication with the WLAN module device under test (DUT) 104. Each DUT 104 includes a test interface 106 that allows ATE 102 to configure DUT 104 for testing, and to extract test data from DUT 104. For example, test interface 106 is often implemented as a Joint Test Action Group (JTAG) interface.

During the test, DUT 104 and ATE 102 communicate over an RF interface 108. RF interface 108 can be an air interface, but is generally implemented as a cable to eliminate interference from sources outside the test.

Testing WLAN modules in the manner shown in FIG. 1 is an expensive and time-consuming process. Considerable time is required due to the complex set up for ATE 102, long processing time, and extra post-processing of the test data for data analysis. In addition, the tests are confined to the limits of ATE 102, which is generally supplied by a third-party vendor.

SUMMARY

In general, in one aspect, an embodiment features an apparatus comprising: a wireless local-area network (WLAN) module comprising a receiver configured to receive a WLAN signal into the WLAN module; a transmitter; and a loopback controller configured to selectively loop back the WLAN signal to the transmitter, wherein the transmitter is configured to transmit the looped-back WLAN signal from the WLAN module.

Embodiments of the apparatus can include one or more of the following features. Some embodiments comprise a signal modifier configured to modify the looped-back WLAN signal; wherein the transmitter is further configured to transmit the modified looped-back WLAN signal. In some embodiments, the receiver is further configured to provide a radio-frequency signal based on the WLAN signal; the loopback controller is further configured to selectively provide the radio-frequency signal to the transmitter; and the looped-back WLAN signal transmitted by the transmitter represents the radio-frequency signal. Some embodiments comprise a downconverter configured to provide a baseband analog signal based on the WLAN signal; and an upconverter, wherein the loopback controller is further configured to selectively provide the baseband analog signal to the upconverter; wherein the looped-back WLAN signal transmitted by the transmitter represents the baseband analog signal. Some embodiments comprise a digital signal processor configured to receive a digital signal, wherein the digital signal represents the WLAN signal; wherein the loopback controller is further configured to cause the digital signal processor to selectively loop back the digital signal; and wherein the looped-back WLAN signal transmitted by the transmitter represents the looped-back digital signal. Some embodiments comprise a signal modifier configured to modify the digital signal; wherein the looped-back WLAN signal transmitted by the transmitter represents the modified digital signal. In some embodiments, the WLAN signal is a first WLAN signal, and the apparatus further comprises: a data generator configured to generate predetermined data; wherein the transmitter is further configured to transmit a second WLAN signal from the transmitter of the WLAN module, wherein the second WLAN signal represents the predetermined data. Some embodiments comprise an error checker configured to compare predetermined data with data represented by the WLAN signal. In some embodiments, the WLAN module is a first WLAN module, and the apparatus further comprises: a second WLAN module configured to transmit the WLAN signal. Some embodiments comprise automated test equipment; wherein the first WLAN module comprises a first test interface configured to communicate with the automated test equipment; and wherein the second WLAN module comprises a second test interface configured to communicate with the automated test equipment.

In general, in one aspect, an embodiment features a method comprising: receiving a wireless local-area network (WLAN) signal into a receiver of a WLAN module; selectively looping back the WLAN signal to a transmitter of the WLAN module; and transmitting the looped-back WLAN signal from the transmitter of the WLAN module.

Embodiments of the method can include one or more of the following features. Some embodiments comprise modifying the looped-back WLAN signal; and transmitting the modified looped-back WLAN signal from the transmitter of the WLAN module. In some embodiments, the WLAN signal is a first WLAN signal, and the method further comprises: generating predetermined data; and transmitting a second WLAN signal from the transmitter of the WLAN module, wherein the second WLAN signal represents the predetermined data. Some embodiments comprise comparing predetermined data with data represented by the WLAN signal. In some embodiments, the WLAN module is a first WLAN module, and the method further comprises: transmitting the WLAN signal from a second WLAN module.

In general, in one aspect, an embodiment features non-transitory computer-readable media embodying instructions executable by automated test equipment to perform functions comprising: causing a first wireless local-area network (WLAN) module to transmit a WLAN signal; causing a second WLAN module to selectively loop back the WLAN signal to a transmitter of the second WLAN module; and causing the second WLAN module to transmit the looped-back WLAN signal from the transmitter of the second WLAN module.

The details of one or more implementations are set forth in the accompanying drawings and the description below. Other features will be apparent from the description and drawings, and from the claims.

Figure 1:
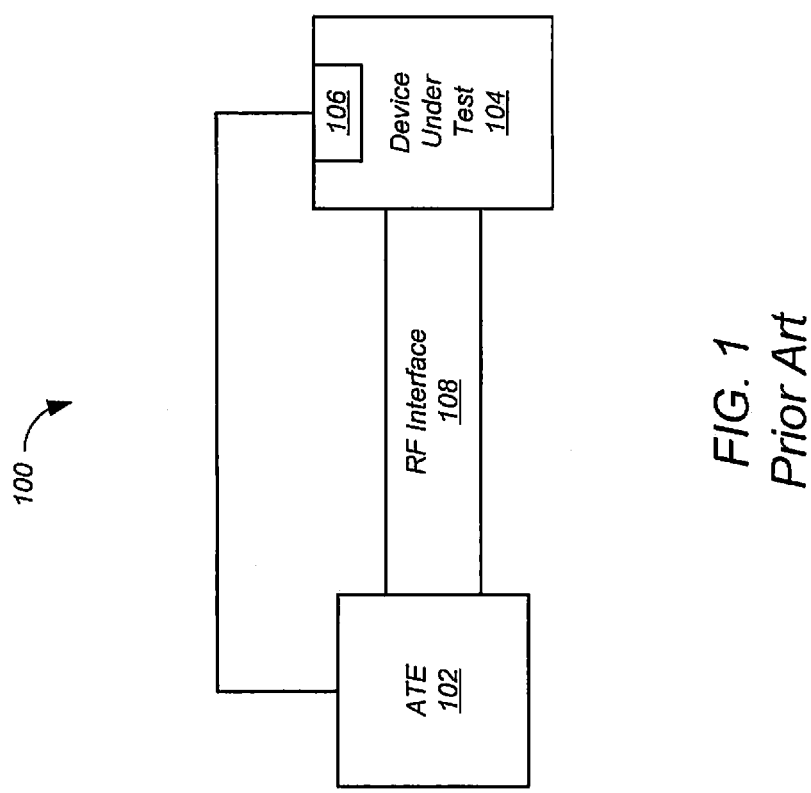
FIG. 1 shows a conventional WLAN module test system.

The leading digit(s) of each reference numeral used in this specification indicates the number of the drawing in which the reference numeral first appears.

DETAILED DESCRIPTION

Embodiments of the present disclosure provide elements of systems for testing modules such as wireless local-area network (WLAN) modules. According to these embodiments, a selected WLAN module is employed as a "golden unit" to test other WLAN modules, also referred to herein as devices under test (DUTs). The golden unit can be selected from among a group of WLAN modules based on traditional testing and the like. The described test method is more realistic than conventional testing methods because WLAN modules are tested through communication with a similar WLAN module, rather than with automated test equipment. In addition, multiple WLAN modules can be tested contemporaneously, thereby conserving test time and resources. For example, a ping-pong technique can be used where one golden unit tests multiple DUTs simultaneously by receiving from one DUT while transmitting to another DUT.

In a loopback mode, the golden unit can transmit WLAN signals received from the device under test (DUT) back to the DUT. The golden unit can loop back the signal at different "depths" within the golden unit. For example, the WLAN signal can be looped back in the analog or digital section of the golden unit. The golden unit can modify the signals before retransmission, for example, to add a tag to the signals, to employ a different modulation scheme, to shift the phase or frequency of the signal, and the like.

In a data generator mode, the golden unit can generate predetermined test data for transmission to the DUT. The DUT loops back the signal transmitted by the golden unit. The golden unit can compare the data represented by the looped-back signal with the test data generated by the data generator. The golden unit can observe payload data, packet numbers, packet error rates, and the like to judge whether the data is correct and the DUT is working correctly.

Figure 2:
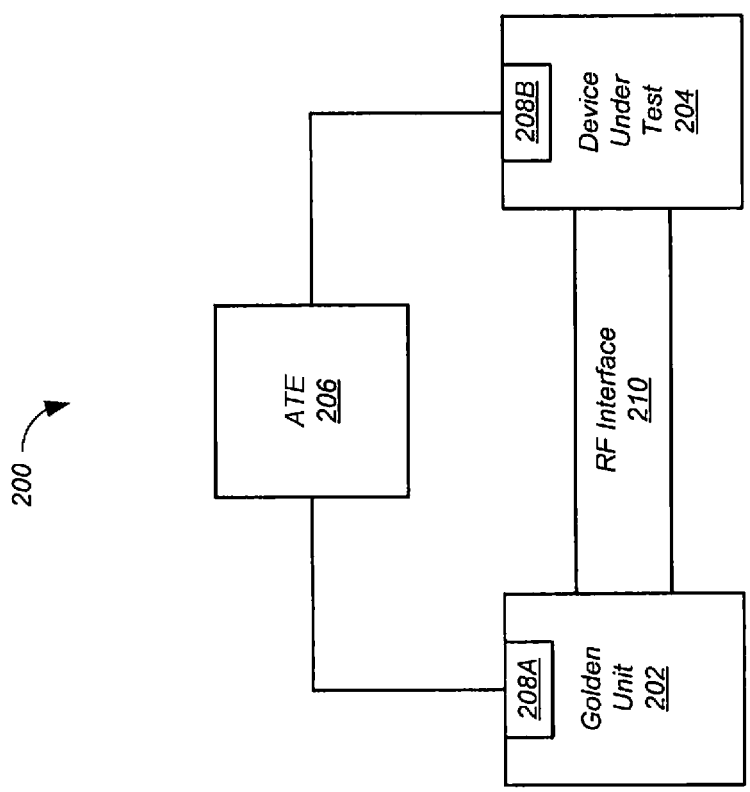
FIG. 2 shows elements of a WLAN module test system according to one embodiment.

FIG. 2 shows elements of a WLAN module test system 200 according to one embodiment. Although in the described embodiments the elements of test system 200 are presented in one arrangement, other embodiments may feature other arrangements. For example, elements of test system 200 can be implemented in hardware, software, or combinations thereof. In some embodiments, elements of test system 200 are compliant with all or part of IEEE standard 802.11, including draft and approved amendments such as 802.11a, 802.11b, 802.11e, 802.11g, 802.11i, 802.11k, 802.11n, 802.11v, and 802.11w.

Referring to FIG. 2, test system 200 includes a golden unit 202, a device under test (DUT) 204, and automated test equipment (ATE) 206. Golden unit 202 and DUT 204 include respective test interfaces 208A and 208B for communication with ATE 206. In some embodiments, test interfaces 208 are implemented as Joint Test Action Group (JTAG) interfaces. During the test, golden unit 202 and DUT 204 communicate over an RF interface 210. RF interface 210 can be implemented as an air interface, a cable, or the like.

Figure 3:
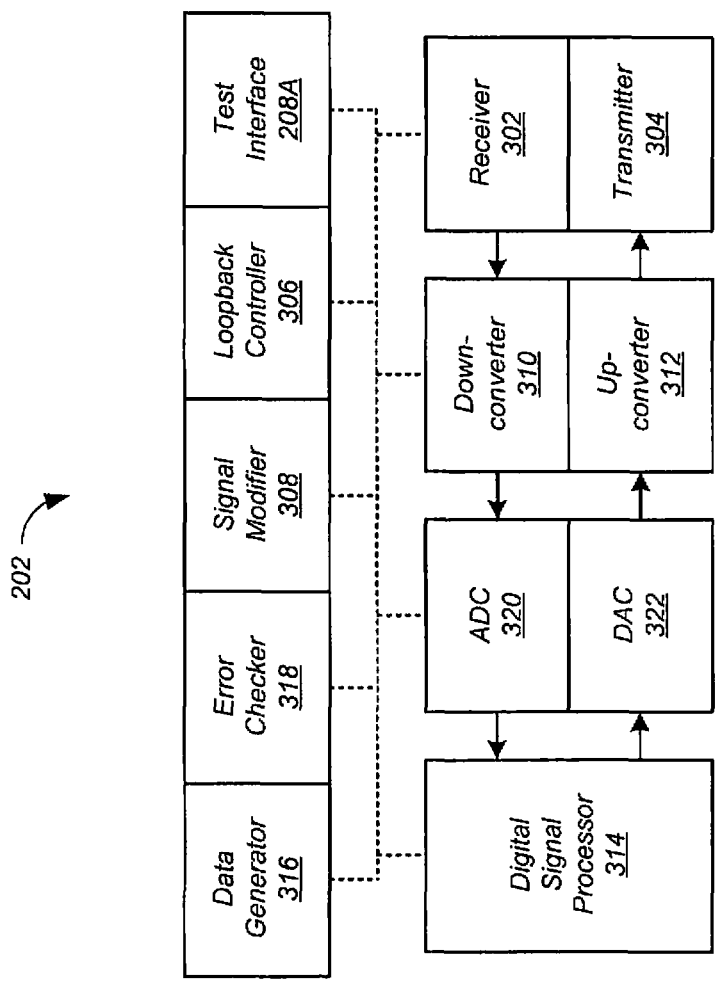
FIG. 3 shows elements of the golden unit of FIG. 2 according to one embodiment.

FIG. 3 shows elements of golden unit 202 of FIG. 2 according to one embodiment. Although in the described embodiments the elements of golden unit 202 are presented in one arrangement, other embodiments may feature other arrangements. For example, elements of golden unit 202 can be implemented in hardware, software, or combinations thereof. Elements of golden unit 202 can be implemented as one or more integrated circuits. For example, golden unit 202 can be implemented as a system-on-chip (SoC).

Referring to FIG. 3, golden unit 202 includes a receiver 302, a transmitter 304, a loopback controller 306, a signal modifier 308, a downconverter 310, an upconverter 312, a digital signal processor (DSP) 314, a data generator 316, an error checker 318, an analog-to-digital converter (ADC) 320, and a digital-to-analog converter (DAC) 322, as well as test interface 208A. Receiver 302 receives RF signals. Downconverter 310 downconverts the RF signals to baseband signals. ADC 320 converts the analog baseband signal to digital signals, which are processed by DSP 314. DSP 314 provides digital signals to DAC 322, which converts the digital signals to analog baseband signals. Upconverter 312 upconverts the baseband signals to RF signals, which are transmitted by transmitter 304.

Under the control of ATE 206, loopback controller 306 causes signals received by receiver 302 of golden unit 202 to be selectively looped back to transmitter 304, which transmits the looped-back signals. Signal modifier 308 modifies the looped-back WLAN signals. Data generator 316 generates predetermined test data. Transmitter 304 transmits WLAN signals representing the predetermined test data. Error checker 318 compares the predetermined test data with data represented by WLAN signals received by receiver 302.

Figure 4:
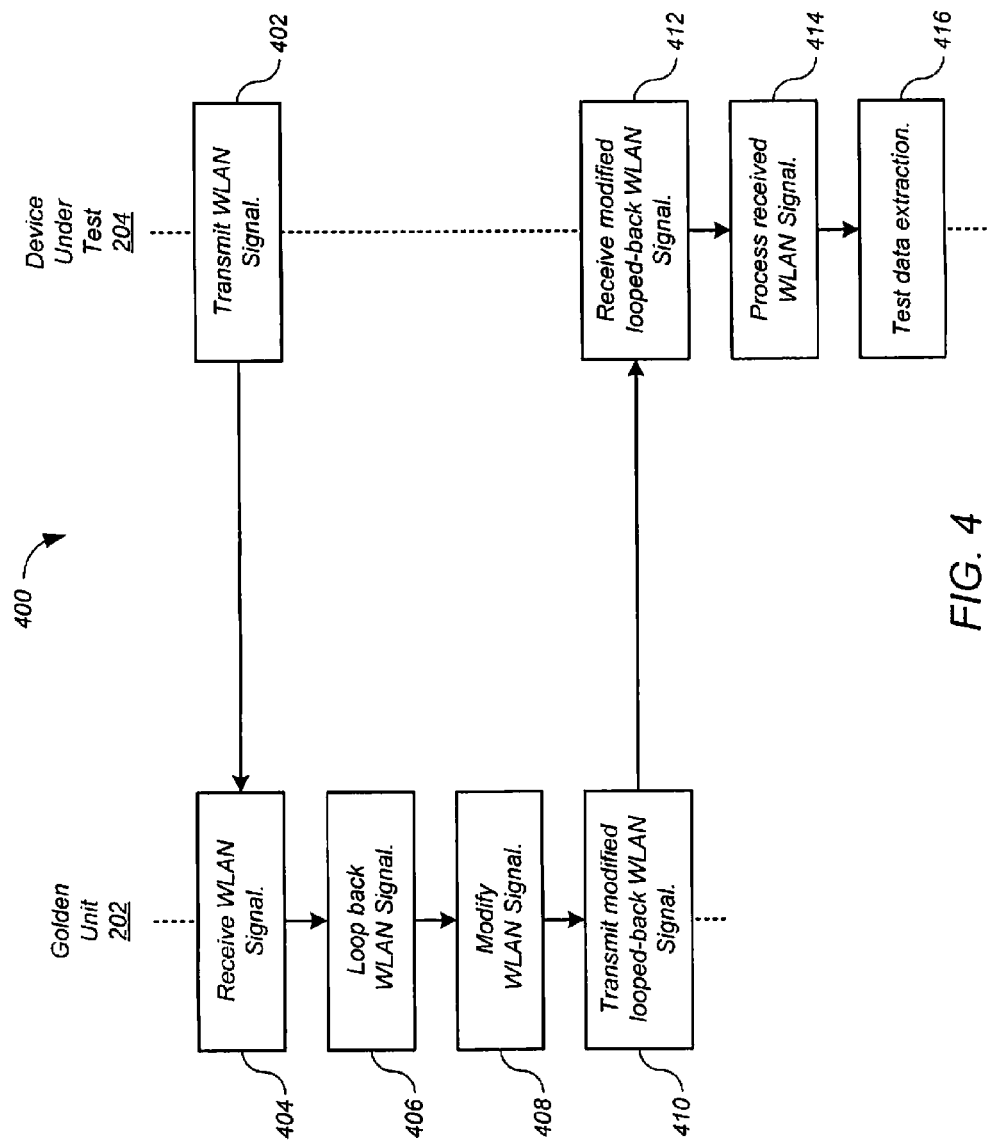
FIG. 4 shows a process for the test system of FIG. 2 to test the DUT using golden unit in loopback mode according to one embodiment.

FIG. 4 shows a process 400 for test system 200 of FIG. 2 to test DUT 204 using golden unit 202 in loopback mode according to one embodiment. Although in the described embodiments the elements of process 400 are presented in one arrangement, other embodiments may feature other arrangements. For example, in various embodiments, some or all of the operations of process 400 can be executed in a different order, concurrently, and the like.

Referring to FIG. 4, at 402 ATE 206 causes DUT 204 to transmit a WLAN signal over RF interface 210. At 404 receiver 302 of golden unit 202 receives the WLAN signal. At 406 ATE 206 causes golden unit 202 to selectively loop back the received WLAN signal. In particular, loopback controller 306 selectively loops back the received WLAN signal.

The WLAN signal can be looped back at different "depths" within golden unit 202. For example, The WLAN signal can be looped back at RF. In particular, receiver 302 provides a RF signal based on the WLAN signal. Loopback controller 306 selectively provides the RF signal to transmitter 304, which transmits a WLAN signal based on the RF signal.

As another example, the WLAN signal can be looped back at baseband. In particular, downconverter 310 provides a baseband analog signal based on the received WLAN signal. Loopback controller 306 selectively provides the baseband analog signal to upconverter 312. Upconverter provides an RF signal to transmitter 304, which transmits a WLAN signal based on that RF signal.

As another example, the WLAN signal can be looped back as a digital signal. In particular, DSP 314 receives a digital signal that represents the WLAN signal. Loopback controller 306 causes DSP 314 to selectively loop back the digital signal. Transmitter 304 transmits a WLAN signal based on based on the looped-back digital signal.

In some embodiments, at 408 ATE 206 causes golden unit 202 to modify the looped-back WLAN signal. For example, signal modifier 308 can add a tag to the looped-back WLAN signal to indicate that the signal has passed through golden unit 202. As another example, signal modifier 308 can employ a different modulation scheme for transmitting the looped-back WLAN signal. Signal modifier 308 can also be employed to conduct negative testing by modifying the signal so as to stress DUT 204, for example by modifying the signal to simulate errors in transmission, to shift the phase or frequency of the signal, and the like.

At 410 transmitter 304 transmits the looped-back signal over RF interface 210. At 412 DUT 204 receives the looped-back WLAN signal. At 414 DUT processes the looped-back WLAN signal. At 416 ATE 206 extracts data from DUT 204 for analysis.

Figure 5:
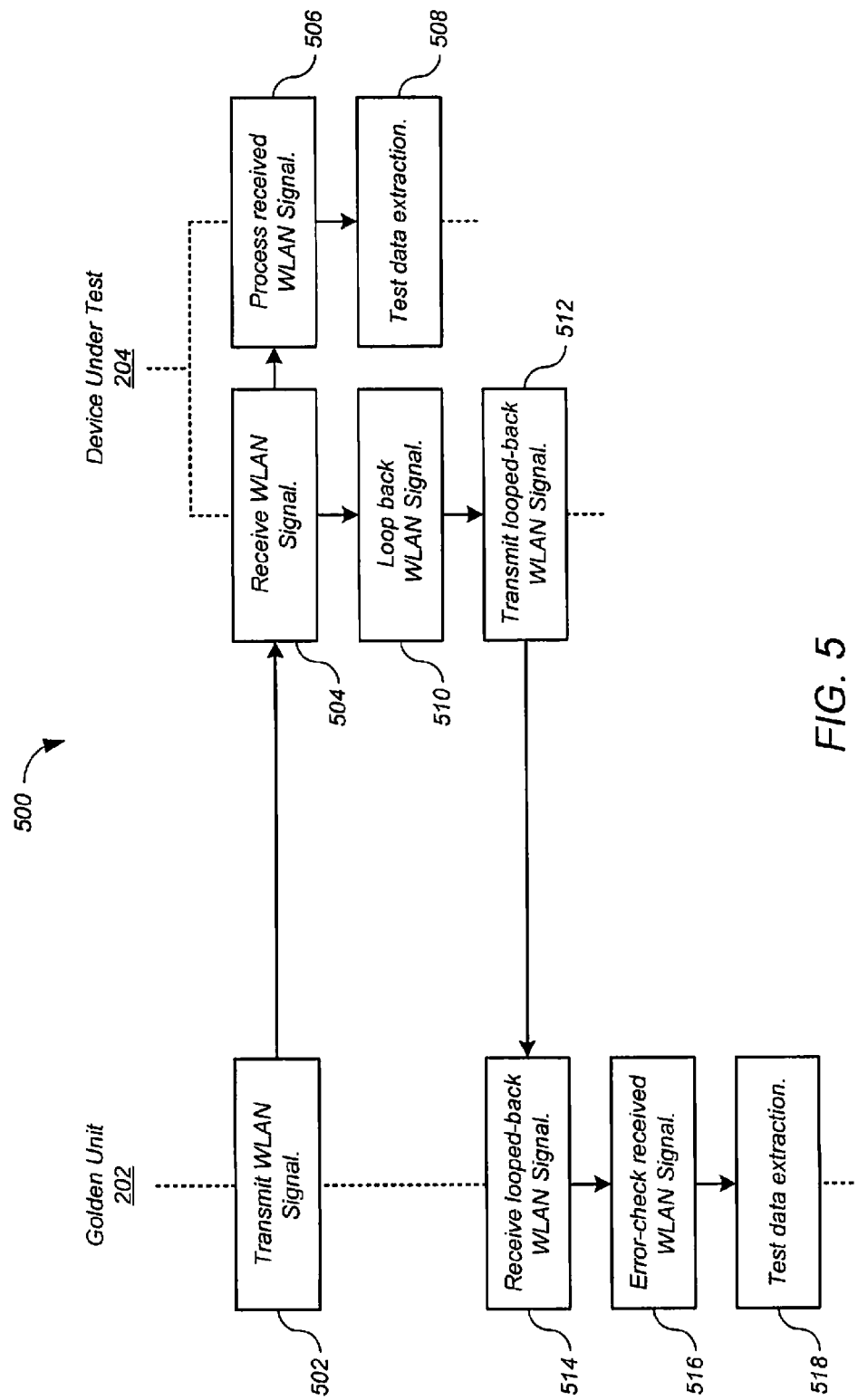
FIG. 5 shows a process for the test system of FIG. 2 to test the DUT using golden unit in data generator mode according to one embodiment.

FIG. 5 shows a process 500 for test system 200 of FIG. 2 to test DUT 204 using golden unit 202 in data generator mode according to one embodiment. Although in the described embodiments the elements of process 500 are presented in one arrangement, other embodiments may feature other arrangements. For example, in various embodiments, some or all of the operations of process 500 can be executed in a different order, concurrently, and the like.

Referring to FIG. 5, at 502 ATE 206 causes golden unit 202 to transmit a WLAN signal representing predetermined test data over RF interface 210. In particular, data generator 316 generates predetermined test data, and transmitter 304 transmits a WLAN signal representing the predetermined test data over RF interface 210. At 504 DUT receives the WLAN signal.

In some embodiments, at 506 DUT 204 processes the received WLAN signal, and at 508 ATE 206 extracts data from DUT 204 for analysis. In other embodiments, ATE 206 causes DUT 204 to loop back the received WLAN signal to golden unit 202 for error checking. In particular, at 510 DUT 204 loops back the received WLAN signal, and at 512 transmits the looped-back signal to RF interface 210. DUT 204 can add a tag to indicate passage through DUT 204. At 514 golden unit 202 receives the looped-back WLAN signal. At 516 error checker 318 compares the data represented by the looped-back WLAN signal with the predetermined test data generated by data generator 316. At 518 ATE 206 extracts data from golden unit 202 for analysis.

In either mode, ATE 206 can characterize each tested DUT 204 by performance limits, and can bin the tested DUTs 204 according to the test data. In particular, the responses of DUTs 204 can vary according to factors such as clock accuracy, manufacturing process, frequency variation, power level variation, and the like. For example, DUTs 204 that work properly in only one frequency band can be packaged, priced, and sold as single-band units.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A network device comprising:
   a first wireless local-area network module configured to facilitate testing of a second wireless local-area network module, wherein the second wireless local-area network module is in a second device, and wherein the first wireless local-area network module comprises
   a receiver configured to (i) based on a first control signal transmitted from test equipment to the second wireless local-area network module, receive a first test signal transmitted from the second wireless local-area network module to the first wireless local-area network module, and (ii) receive a second control signal transmitted from the test equipment to the network device,
   a signal modifier configured to perform negative testing of the second wireless local-area network module including modifying the first test signal to stress test the second wireless local-area network module, wherein the signal modifier is configured to modify the first test signal to simulate errors in transmission of the first test signal between the first wireless local-area network module and the second wireless local-area network module, and wherein the modified first test signal is phase shifted from the first test signal received at the first wireless local-area network module, a transmitter, and a controller configured to provide the modified first test signal to the transmitter, wherein the transmitter is configured to, based on the second control signal, transmit the modified first test signal from the first wireless local-area network module back to the second wireless local-area network module.

2. The network device of claim 1, wherein:

the receiver is configured to provide a radio-frequency signal based on the first test signal received at the first wireless local-area network module;

the radio-frequency signal includes the modified first test signal;

the controller is configured to provide the radio-frequency signal to the transmitter; and the transmitter is configured to transmit the radio-frequency signal to the second wireless local-area network module.

3. The network device of claim 1, further comprising:

a downconverter configured to provide a baseband analog signal based on the first test signal received at the first wireless local-area network module, wherein the baseband signal includes the modified first test signal; and an upconverter configured to generate a radio frequency signal in response to the baseband signal, wherein the controller is configured to provide the baseband signal to the upconverter, and wherein the transmitter is configured to transmit the radio frequency signal to the second wireless local-area network module.

4. The network device of claim 1, further comprising:

a digital signal processor configured to receive a digital signal, wherein the digital signal is a digital version of the first test signal;

a digital-to-analog converter configured to convert the digital signal to an analog signal; and an upconverter configured to generate a radio frequency signal based on the analog signal, wherein the radio frequency signal includes the modified first test signal, wherein the controller is configured to cause the digital signal processor to provide the digital signal to the digital-to-analog converter; and wherein the transmitter is configured to transmit the radio frequency signal to the second wireless local-area network module.

5. The network device of claim 4, wherein:

the signal modifier is configured to modify the digital signal, wherein the digital-to-analog converter is configured to convert the modified digital signal to the analog signal.

6. A system comprising:

the network device of claim 1;

the second device comprising the second wireless local-area network module; and the test equipment configured to transmit the first control signal to the second device to cause the second wireless local-area network module to transmit the first test signal to the first wireless local-area network module to test the second wireless local-area network module, and transmit the second control signal to the network device to cause the first wireless local-area network module to transmit the modified first test signal the second wireless local-area network module to facilitate the testing of the second wireless local-area network module.

7. The network device of claim 1, wherein:

the signal modifier is configured to add a tag to the modified first test signal;

the tag indicates that the first test signal received at the first wireless local-area network module has passed through the first wireless local-area network module; and the transmitter is configured to transmit the modified first test signal including the tag to the second wireless local-area network module.

8. The network device of claim 1, wherein the transmitter is configured to transmit the modified first test signal including the simulated errors to the second wireless local-area network module.

9. The network device of claim 1, wherein:

the signal modifier is configured to shift a phase of the first test signal to generated the modified first test signal; and the transmitter is configured to, subsequent to the phase of the first test signal being shifted, transmit the modified first test signal to the second wireless local-area network module.

10. A method comprising:

receiving a first test signal at a first wireless local-area network module from a second wireless local-area network module based on a first control signal transmitted from test equipment to the second wireless local-area network module, wherein the first wireless local-area network module is in a first network device, and wherein the second wireless local-area network module is in a second network device;

performing negative testing of the second wireless local-area network module including modifying the first test signal to stress test the second wireless local-area network module, wherein the first test signal is modified to simulate errors in transmission of the first test signal between the first wireless local-area network module and the second wireless local-area network module, and wherein the modified first test signal is phase shifted from the first test signal received at the first wireless local-area network module;

providing the modified first test signal to a transmitter of the first wireless local-area network module;

receiving a second control signal transmitted from the test equipment to the first network device; and based on the second control signal, facilitating testing of the second wireless local-area network module by transmitting the modified first test signal from the transmitter of the first wireless local-area network module to the second wireless local-area network module.

11. A network device comprising:

a first wireless local-area network module configured to, based on a first control signal transmitted from test equipment to the network device, transmit a first test signal to a second wireless local-area network module to test the first wireless local-area network module, wherein the second wireless local-area network module is in a second device, and wherein the first wireless local-area network module comprises a transmitter configured to transmit the first test signal to the second wireless local-area network module, a receiver configured to, based on a second control signal transmitted from the test equipment to the second wireless local-area network module, receive a modified version of the first test signal from the second wireless local-area network module, wherein the modified version of the first test signal
- is transmitted from the second wireless local-area network module the first wireless local-area network module,
- is received by the receiver to perform negative testing of the first wireless local-area network module including stress testing the first wireless local-area network module,
- simulates errors in transmission of the first test signal between the first wireless local-area network module and the second wireless local-area network module, and
- is phase shifted from the first test signal, a processor configured to process the first test signal to generate test data, and an interface configured to transmit the test data from the first wireless local-area network module to the test equipment for analysis of the test data.

12. The network device of claim 11, wherein:
the modified version of the first test signal includes a tag; and
the tag indicates that the first test signal has passed through the first wireless local-area network module.

13. The network device of claim 11, wherein:
the first wireless local-area network module comprises a data generator and an error checking device;
the data generator is configured to generate predetermined data;
the first test signal includes the predetermined data; and
the error checking device is configured to compare the modified version of the first test signal received from second wireless local-area network module to the predetermined data to detect errors in the modified version of the first test signal received from the second wireless local-area network module.

14. A system comprising:
the network device of claim 11;
the second device comprising the second wireless local-area network module; and
the test equipment configured to
- transmit the first control signal to the network device to cause the first wireless local-area network module to transmit the first test signal to the second wireless local-area network module to test the first wireless local-area network module, and
- transmit the second control signal to the second device to cause the second wireless local-area network module to transmit the modified version of the first test signal to the first wireless local-area network module to facilitate the testing of the first wireless local-area network module.

* * * * *